Figure 1:
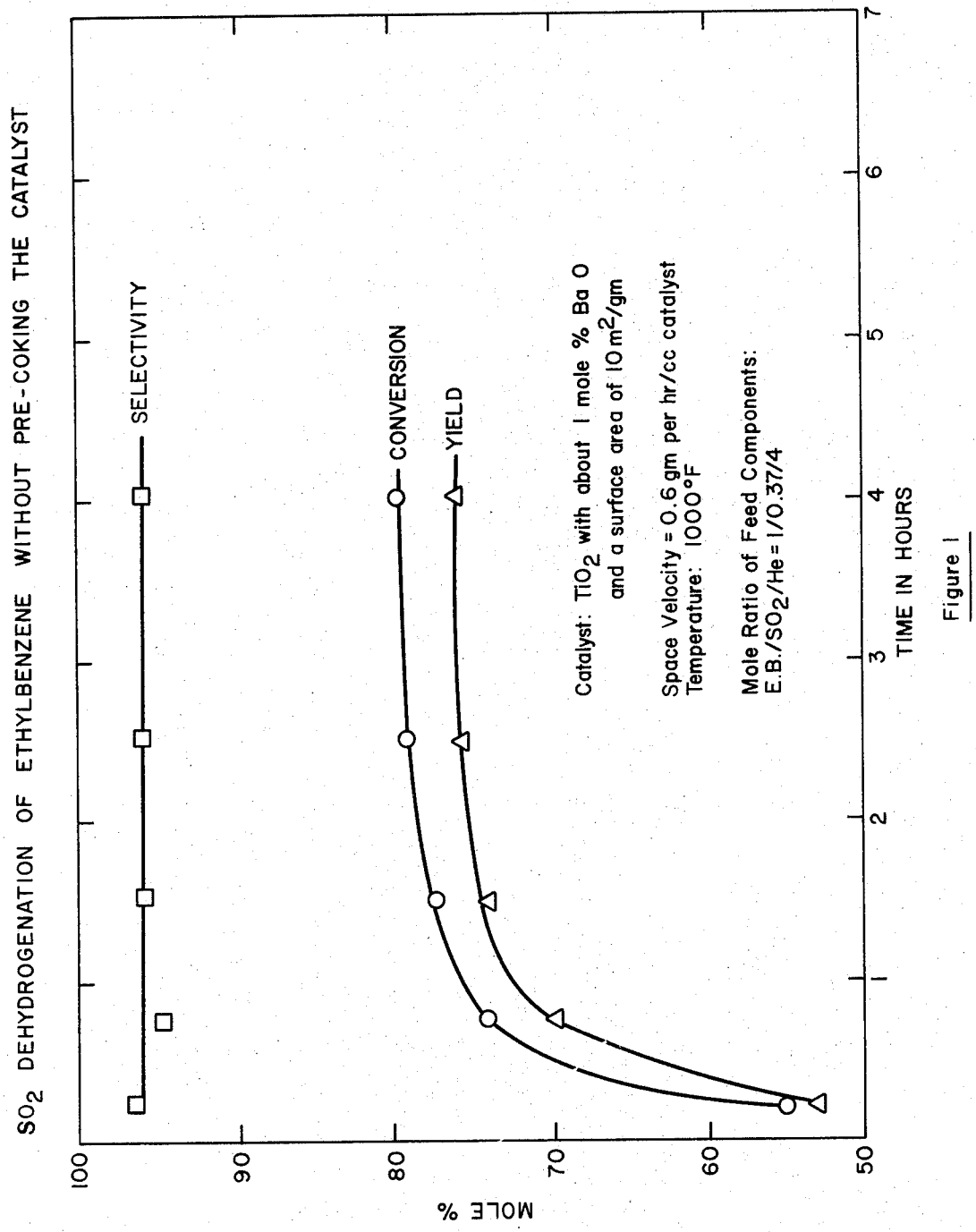

United States Patent [19]

Cohen

[11] 3,758,625

[45] Sept. 11, 1973

[54] DEHYDROGENATION CATALYST
[75] Inventor: Abraham D. Cohen, Sarnia (Lambton), Ontario, Canada
[73] Assignee: Esso Research and Engineering Company, Linden, N.J.
[22] Filed: Apr. 30, 1971
[21] Appl. No.: 138,938

[52] U.S. Cl........ 260/669 R, 260/680 E, 260/683.3
[51] Int. Cl.......................... C07c 5/18, C07c 15/10
[58] Field of Search .................... 260/669 R, 680 E, 260/683.3

[56] References Cited
UNITED STATES PATENTS
3,403,192   9/1968   Vadekar et al. ................ 260/669 R
3,636,183   1/1972   Pasternak et al. .............. 260/669 R Primary Examiner—Curtis R. Davis
Attorney—Chasan & Sinnock and D. C. Caulfield

[57] ABSTRACT

In the dehydrogenation of an organic compound in the vapor phase in the presence of a sulfur compound over a low surface area dehydrogenation catalyst, the initial conversion and thus overall yield to the desired dehydrogenated product is significantly increased by depositing a controlled amount of carbonaceous material, i.e., coke, on the surface of the said catalyst before introducing said catalyst into the dehydrogenation zone. Preferably, about 0.01 to about 20 wt. percent carbonaceous materials, i.e., coke, is deposited on the surface of the low surface area dehydrogenation catalyst before introduction into the dehydrogenation zone in order to initially increase the conversion and thus the overall yield to the desired dehydrogenated product.

10 Claims, 2 Drawing Figures

DEHYDROGENATION CATALYST

FIELD OF THE INVENTION

This invention relates to depositing carbonaceous materials, i.e., coke, on the surface of a low surface area dehydrogenation catalyst before introducing said catalyst into the dehydrogenation zone. More particularly, this invention relates to increasing the yields to the desired dehydrogenated product during the initial stages of the dehydrogenation reaction by dehydrogenating an organic compound in the vapor phase in the presence of sulfur and/or sulfur compounds (e.g., $SO_2$) with or without $O_2$ over a low surface area dehydrogenation catalyst having from about 0.01 wt. percent to about 20 wt. percent carbonaceous materials, i.e., coke deposited on the surface thereof. In a typical embodiment, from about 2 to about 12 wt. percent coke is deposited on a magnesium oxide catalyst having a surface area in the range from about 4 to about 80 $m^2/g$ and thereafter introducing said catalyst into the dehydrogenation zone wherein ethylbenzene is dehydrogenated to styrene by contacting ethylbenzene with from about 0.2 to 0.7 moles of sulfur dioxide/mole of ethylbenzene in the presence of steam over the above-described magnesium oxide catalyst having from about 4 to about 8 wt. percent carbonaceous material deposited thereon.

PRIOR ART

The catalytic, vapor phase dehydrogenation of organic compounds to produce unsaturated or more highly unsaturated products than the feed in the presence of sulfur dioxide has long been known to the art; for example, see U.S. Pat. No. 2,126,817. Generally, the overall endothermic reaction for the sulfur dioxide dehydrogenation of a hydrocarbon feedstock, for the dehydrogenation of a given dehydrogenatable carbon-carbon bond (i.e., bonded adjacent carbon atoms with at least one hydrogen atom bonded to each carbon atom), is in accordance with the following generalized formula:

$$3 C_nH_{2n+2} + SO_2 \rightarrow 3C_nH_{2n} + H_2S + 2H_2O \quad (I)$$

which shows that one-third mole of sulfur dioxide is theoretically required to dehydrogenate one mole of feedstock. While many processes have been reported, the commercial development of a sulfur dioxide process has been rather permanently delayed due to serious problems involving catalyst life. Thus, it is believed that, while dehydrogenation is the principal reaction occurring, a portion of the feedstock and product is being simultaneously degraded to form coke. This coke is formed at the surface of the catalyst, thereby shielding the catalyst from the reactants and causing rapid catalyst deactivation. The coke reaction is further promoted by the presence of sulfur-containing compounds which are known to promote coking at reaction temperatures and are generally present due to side reactions between the hydrocarbon and sulfur dioxide. See, for example, U.S. Pat. No. 3,299,155 and Japanese Pat. No. 468,503, wherein the mole ratio of sulfur dioxide to hydrocarbon charge is maintained at from about 1:1 to about 2:1; and about 1.3:1 respectively. Furthermore, when sulfur levels falling below those claimed are employed, such as to approach the stoichiometric equivalent, there is a significant loss in yield to the desired hydrogenated compound (see Japanese Pat. No. 468,503—Table I). Consequently, the use of such high sulfur levels, in addition to drastically reducing catalyst life by promoting coke formation, significantly reduces the conversion level and selectivity, and thus the yield to the desired dehydrogenated compounds. Furthermore, it is highly desirable in commercial applications to employ an inert diluent to reduce hydrocarbon losses to burning, coke and heavy products. Preferably, this Equation I) diluent is steam in order to facilitate a realtively easy product recovery system. Unfortunately, the catalysts reported in the prior art are severly deactivated in the presence of steam. In copending applications U.S. Ser. Nos. 780,528 and 886,582, filed Dec. 2, 1968, now U.S. Pat. No. 3,585,248 and Dec. 19, 1969, now U.S. Pat. No. 3,636,183, respectively, a process has been described which tends to eliminate or substantially inhibit cracking and/or burning reactions and allow the use of sulfur oxides approaching the theoretical level (as given by EquationI) more closely than had been believed possible by the prior art for the conversions and yields obtained. In U.S. Ser. Nos. 780,528 and 886,582, the pertinent disclosures of which are incorporated herein by reference, there is disclosed a process for dehydrogenating a compound having at least one

grouping wherein adjacent carbon atoms are bonded to each other and have at least one hydrogen atom attached to each carbon atom (such as the ethyl group in ethylbenzene) by contacting such compounds with sulfur oxide, i.e., $SO_2$ or $SO_3$ or water solutions thereof in the presence of an inert diluent, preferably steam, over a critically defined low surface area catalyst. Preferably, the catalyst is a magnesium oxide catalyst having a surface area in the range of from about 4 square meters per gram to about 80 square meters per gram. While the above-described processes as embodied in U.S. Ser. Nos. 780,528 and 886,582 represent a significant advance in the art, a particularly puzzling aspect of the above-described processes is the initial dehydrogenation period wherein yields to the dehydrogenated product do not approach those obtained after the process has been in operation for a period of about ¼ to 5 hours, depending on the severity of the reaction conditions. The present invention, however, overcomes this disadvantage by significantly increasing the yields to the desired dehydrogenated product in the initial stages of the dehydrogenation reaction while decreasing the selectivity loss of the feed to coke on the catalyst, and thus ultimately increasing the overall yield to the desired dehydrogeanted product.

SUMMARY OF THE INVENTION

In accordance with this invention, therefore, it has been found that when a low surface area dehydrogenation catalyst having a controlled amount of carbonaceous material deposited on the surface thereof is initially employed to dehydrogenate an organic compound in the vapor phase in the presence of sulfur and/or sulfur compounds with or without oxygen, initial conversion levels and selectivities are significantly increased to the desired dehydrogenated product during the initial stages of the dehydrogenation reaction. The surprising advantage of precoking the catalyst is that it allows the use of a fluidized catalyst bed process. It is thought that in the fixed bed process when the catalyst does not contain a controlled amount of carbonaceous materials deposited thereon, the catalyst is slowly activated via preferential coke depositation in a given region of the catalyst bed. Here sulfur and H₂S are produced to facilitate coke laydown in lower portions of the catalyst bed. Unfortunately, in a fluidized bed this process is disrupted by the continual mixing of the catalyst particles and thus adequate coke laydown for an efficient regime is extremely difficult. Preferably, from about 0.01 to about 15 wt. percent carbonaceous material, i.e., coke, is deposited on the surface of the low surface area dehydrogenation catalyst in order to significantly increase the yield to the desired dehydrogenated product during the initial stages of the dehydrogenation reaction.

As disclosed in copending U.S. application Ser. Nos. 780,528 and 886,582, it is believed that the success of the process described herein is due in large part to the discovery that low surface area catalysts are selective in promoting the desired reaction and tend to minimize hydrocarbon burning and coke formation. The use of such catalysts has been a reversal of the general trend in catalysis, i.e., the use of high surface area catalysts, such as activated alumina, activated carbon, and molecular sieves, etc. Since high surface area catalysts have been used successfully in endothermic reactions, it would seem reasonable to believe that they could be effectively utilized in the endothermic sulfur dioxide dehydrogenation of a hydrocarbon feedstock. Nevertheless, it has been found that high surface area catalysts are ineffective and that low surface area catalysts are essential to the practice of this invention. Thus, high surface area catalysts tend to increase (catalyze) the rate of burning reactions, e.g., $$C_nH_{2n+2} + (3_{n+1})/2 \, SO_2 \rightarrow nCO_2 + (n+1)H_2O + (3_{n+1})/2 \, S$$

thereby encountering two major disadvantages. First, since the burning reaction will require far more SO₂ per mole of dehydrogenatable organic compound than the desired dehydrogenation reaction, burning of only a small amount of hydrocarbon removes a large amount of SO₂ from the system and makes it unavailable for dehydrogenation. Secondly, since burning is an exothermic reaction, whereas dehydrogenation with SO₂ is endothermic, any amount of burning will tend to heat the catalyst bed resulting in either localized or generalized hot spot formation. The hot spots will tend to increase the rate of burning and cracking reactions as well as increasing catalysts fouling due to coke formation. Thus, hot spots give rise to both a lower yield of desired products and rapid catalyst deactivation.

Accordingly, it is essential to employ a low surface area dehydrogenation catalyst for the reaction described herein. This requirement is necessitated by the fact that the catalyst must be selective to the desired reaction while inhibiting undesired side reactions such as cracking and/or burning. It has now been discovered that when a controlled amount of carbonaceous materials is deposited on the surface of the low surface area dehydrogenation catalyst, and thereafter said low surface area dehydrogenation catalyst containing carbonaceous materials is employed in a sulfur promoted dehydrogenation reaction system as described above, initial conversion and selectivity rate to the desired dehydrogenation process are significantly increased over those rates heretofore obtained so as to increase the overall yield to the desired dehydrogenated product. However, in view of the fact that a coke formation on the catalyst drastically reduces catalyst life and significantly reduces the conversion level and selectivity, it is essential that the amount of carbonaceous materials deposited on the low surface area dehydrogenation catalyst be carefully controlled in order that catalyst life will not be unduly shortened. Accordingly, the amount of coke which is deposited on the surface of the catalyst should not exceed about 20 wt. percent in coke and preferably should be in the range of from about 0.01 to about 15 wt. percent coke, and more preferably in the range of from about 2.0 to about 12.0 wt. percent coke, and most preferably from about 4.0 to about 8.0 wt. percent coke based on the total weight of the catalyst and carbonaceous materials.

DESCRIPTION OF THE FIRST DRAWING

Turning now to FIG. 1, which drawing shows a plot of the dehydrogenation process of the instant invention in time in hours against the mole percent conversion, selectivity and yield of ethylbenzene dehydrogenation to styrene over a low surface area dehydrogenation catalyst in the presence of a sulfur compound, it will be noticed that during the initial stages of the dehydrogenation reaction the conversion and yield to the dehydrogenated product is significantly below that which is obtained after the process is on stream for a period of about 3 hours. The data for these curves were obtained in an ethylbenzene dehydrogenation, the ethylbenzene/sulfur dioxide/helium mole ratio being 1/0.37/4, and a space velocity of 0.6 g/hr./cc catalyst at a temperature of 1,000°F. over a titanium oxide catalyst containing about 1 mole percent barium oxide, said catalyst having a surface area in the range of about $10^2 m/g$.

The instant invention discloses that depositing a controlled amount of carbonaceous material on the catalyst in the manner herein disclosed has the unexpected result of obviating the catalyst activation period illustrated in FIG. 1. Thus, not only does the catalyst having coke deposited on the surface initially increase the conversion rate to the desired dehydrogenated product, but ultimately increases the overall yield to said product. Additionally, the loss of feed selectivity to coke on the catalyst is reduced since the most active coke forming sites on the catalyst are precoked, further increasing feed selectivity to product.

The advantages of discovering that initial conversion levels and thus initial yields to the desired dehydrogenated product are markedly increased when employing a low surface area catalyst having a controlled amount of carbonaceous materials deposited on the catalyst surface, are manifest. In addition to increased product yield to the desired dehydrogenated product, another significant advantage of the pretreated catalyst of the instant invention is that this catalyst is considerably more active at relatively low temperatures. Furthermore, the use of the catalyst of the instant invention allows a low sulfur level to be employed in the dehydrogenation zone.

The process of this invention can be applied to a great variety of dehydrogenatable organic compounds to obtain the unsaturated derivatives thereof. A suitable dehydrogenatable compound can be any organic compound that contains at least one

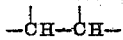

grouping, i.e., adjacent carbon atoms bonded to each other and each attached to at least one hydrogen atom. Preferably, such compounds have from 2 to about 20 carbon atoms. In addition to carbon and hydrogen, these compounds may also contain oxygen, halogens, nitrogen and sulfur. Among the classes of organic compounds which can be dehydrogenated by this process are: alkanes, alkenes, alkyl halides, ethers, esters, aldehydes, ketones, organic acids, alkyl aromatic compounds, alkyl heterocyclics, cyanoalkanes, cyanoalkenes, and the like. Illustrative applications include: ethylbenzene to styrene, isopropyl benzene to α-methyl styrene, cyclohexane to benzene, vinyl cyclohexane or vinyl cyclohexene to styrene, ethane to ethylene, n-butane to butenes and butadiene, butene to butadiene, isobutane to isobutylene, methyl butene to isoprene, propionaldehyde to acrolein, ethyl chloride to vinyl chloride, propionitrile to acrylonitrile, methyl isobutyrate to methyl methacrylate, propionic acid to acrylic acid, ethyl pyridine to vinyl pyridine, and the like. Preferred dehydrogenatable feed stocks are the $C_2$–$C_{20}$ hydrocarbons, i.e., paraffins, alkyl benzenes, alkyl and alkenyl substituted cycloaliphatic compounds, and monoolefins. Particularly preferred, however, are $C_2$–$C_9$ paraffins, $C_3$–$C_9$ monoolefins, $C_8$–$C_{16}$ alkyl benzenes, and $C_8$–$C_{16}$ alkyl and alkenyl substituted cycloaliphatic compounds, still more particularly $C_4$–$C_8$ monoolefins and paraffins, $C_8$–$C_{10}$ alkyl benzenes, and $C_8$–$C_{10}$ alkyl and alkenyl substituted cycloaliphatic compounds. Particularly effective as feed stocks are the olefinic hydrocarbons or alkyl benzenes or vinyl substituted cycloaliphatics which may be dehydrogenated to provide a product wherein the major unsaturated product has the same number of carbon atoms as the feed hydrocarbon. Ethylbenzene is a particularly preferred dehydrogenatable compound and its reaction with sulfur dioxide in accordance herewith results in ethylbenzene conversions in excess of 80 percent, preferably 85 percent, with selectivity to styrene in excess of 85 percent, preferably 90 percent, resulting in styrene yields in excess of 75 percent, preferably in excess of 80 percent.

In yet another embodiment, dehydrocyclization can also be effected. Thus, $C_6$–$C_8$ paraffins, e.g., hexane, heptane, octane, can be converted into $C_6$–$C_8$ aromatics, e.g., benzene, toluene, ethylbenzene, para-xylene.

The inert diluent which may be employed to reduce the partial pressure of the reactants may be any gas normally inert under the conditions of the reaction. Illustrative of the gases that may be employed are: helium, nitrogen, carbon monoxide, carbon dioxide, steam, etc., as well as methane, waste gases containing methane, and mixtures of the foregoing. Preferably, however, the diluent is steam or a mixture of diluents which is primarily steam, e.g., steam and helium, steam and nitrogen, steam and carbon dioxide, etc.

The molar ratio of inert diluent to dehydrogenatable compound is not critical and may vary over a wide range as long as at least about 1 mole of diluent per mole of dehydrogenatable compound is present. This value, however, is merely an arbitrary limit at which the yield of dehydrogenated product becomes practical and economical. Molar ratios below this value will also show increases in yield, generally the conversion and yield increasing with increased dilution of the sulfur oxide. The upper limit is not at all critical and larger amounts of diluent will only serve to further reduce the partial pressure of the reactants. Preferably, however, a molar ratio of 1 to 20, more preferably 1 to 8, of diluent to dehydrogenatable compound is employed. It will be obvious to one skilled in the art that this same result can be accomplished by operating under reduced pressures. However, use of an inert diluent is preferred, since it alleviates problems of vacuum equipment.

The conditions under which the reaction is effected are not generally critical and can be the conditions under which normal vapor phase catalytic dehydrogenation reactions are effected. Thus, reaction temperatures should be at least about 700°F., preferably 800° to 1,500°F., and more preferably 900° to 1,200°F. Similarly, pressures may vary widely and can range from subatmospheric, e.g., 0.1 atmosphere, to superatmospheric, e.g., 50 atmospheres or higher. Preferably, however, pressures may range from about 1 to 3 atmospheres.

As previously mentioned, it is highly desirable to employ low surface area catalysts for the reaction described hwerein. The low surface area requirement is necessitated by the fact that the catalyst must be selective to the desired reaction while minimizing undesired side reactions such as cracking and/or burning (high surface area catalysts promote burning and/or cracking). Various catalysts can be employed which satisfy the low surface area criterion, among which are those that are or could be employed as catalyst support materials. These catalysts can also be described as difficultly reducible oxides or refractory oxides or mixtures of oxides and can be selected from the oxides of metals of Ggroups II–VIII of the Periodic Chart of the Elements, preferably of Groups IIA, IIIA, IVA, IVB, VB, VIB, and VIIB, and most preferably Groups IIA, IIIA, IVA, IVB and VB. Suitable examples of such materials are magnesia, barium oxide, thoria, alumina, boria, vanadia, chromia, titania, silica, silica-alumina, tungsten oxide, zirconia, hafnium oxide and the like. Of these, silica, alumina, vandia, magnesia and titania are most preferred, particularly alumina and titania. It will be recognized that these catalysts need not start out as oxides but may be converted to the oxides during the course of the reaction. For example, a nitrate or hydroxide salt is readily converted to its corresponding oxide at reaction temperatures.

Another class of catalysts applicable to this invention and highly preferred are those based on titanium and oxygen, i.e., titanates. These catalysts have shown exceptional stability and give good yields of the desired dehydrogenated products. Applicable titanates are those wherein any metal from Groups I–VIII of the Periodic Chart of the Elements is combined with titanium and oxygen. Typically active titanates are: lithium titanate, barium titanate, cerium titanate, nickel titanate, lead titanate, strontium titanate, and the like. It is noted that titanium metal, by itself, can also be employed successfully.

Additionally, such common support materials as silicon carbide; carbon, e.g., coke, graphite; diatomaceous earths, e.g., kieselguhr; clays, both natural and synthetic, e.g., attapulgite calys; magnesium silicates; phosphates, e.g., calcium nickel phosphate, aluminum phosphate; and the like which are of low surface area can also be employed, although somewhat less effectively than the other materials listed hereinabove.

Of course, all of the catalysts mentioned hereinabove are low surface area catalysts (as measured by nitrogen adsorption) and can be successfully employed in the dehydrogenation process. Nevertheless, it has also been found that a critical surface area range exists for many catalysts within which the yield of dehydrogenated product is markedly greater than would ordinarily be expected. Thus, for example, alumina catalysts have a critical surface area range starting above a threshold surface area of about 0.6 $m^2/g$ where the yield of dehydrogenated produce increases by about ten-fold. While a critical upper limit where product yield falls off sharply does not exist as such, the increasing make of by-products and increased coking which accompany increasing surface area establishes a critical upper limit above which it becomes uneconomical to proceed with the reaction. Consequently, it is preferred that alumina catalysts have a surface area ranging from about 0.5 to 100 $m^2/g$, preferably about 0.5 to 50 $m^2/g$, and more preferably about 0.5 to 30 $m^2/g$.

It has been described in copending U.S. Ser. No. 886,582, the most preferred low surface area dehydrogenation catalyst is a magnesium oxide catalyst. When steam is employed as the inert diluent, a critical surface area range starting above the threshold surface area of about 4 square meters per gram exists for magnesium oxide with a yield of the dehydrogenated product increases by about ten-fold. A critical upper surface area limitation where product yield falls off sharply does not exist for the magnesium oxide catalyst since the upper limit depends upon the reaction temperatures employed. It is preferred that the magnesium oxide catalyst have a surface area ranging from about 4 to about 80 square meters per gram, more preferably from about 10 to about 70 square meters per gram, and still more preferably from about 20 to about 60 square meters per gram.

The exact surface area levels for the catalysts which result in markedly increased product yields are not known with exactitude because of the many and varied catalysts which can be employed herein. Nevertheless, it is believed that one skilled in the art can readily determine these levels, particularly since the levels are thought to be rather similar to those determined for alumina, i.e., at least above about 0.5–1.0 $m^2/g$.

Now it can be generally said that the higher the surface area, the more the coking and burning; the higher the quantity of sulfur oxide required for a given yield, the lower the catalyst life. Taking these directions into consideration, lower surface areas are to be preferred and surface areas that are readily usable in the process of this invention, regardless of catalyst material, should range from about 0.1 $m^2/g$ to about 100 $m^2/g$, preferably 0.1 to 70 $m^2/g$, more preferably about 0.5 to 50 $m^2/g$, again keeping in mind minor variations depending upon choice of catalyst.

In another embodiment hereof, it has been found that a catalyst which incorporates a minor proportion of a metal or a metal salt, e.g., halides, phosphates, sulfates, etc., oxide, or hydroxide of an alkali or alkaline earth metal or of palladium promotes an increase in the yield of dehydrogenated product as well as markedly increasing the life of the catalyst. Many of these salts, oxides, hydroxides or metals may change during the preparation of the catalyst, during heating in the reactor, prior to or during the reaction or are converted to another form under the reaction conditions, but such materials still function as effective catalysts in this process. For example, many metals, metal nitrates, nitrites, carbonates, hydroxides, acetates, sulfites, sulfides and the like may be readily converted to the corresponding oxide under the defined reaction conditions. Salts such as phosphates, silicates and halides are stable at reaction conditions and are also effective in increasing catalyst life. At any rate, the catalysts are effective, if the listed metals or their compounds are present in a catalyst amount in contact with reaction gases. Preferred are the oxides and chlorides of the listed metals, as well as the metals themselves. Of the alkali metals, i.e., lithium, sodium, potassium, rubidium, and cesium, it is preferred to utilize sodium or potassium as the metals or derivatives thereof, most preferably sodium. Of the alkaline earth metals, i.e., beryllium, magnesium, calcium, strontium, and barium, it is preferred to utilize calcium or barium as the metals or derivatives thereof, most preferably barium. It is also noted that palladium, e.g., palladium chloride, acts similarly as the alkali or alkaline earth metals with regard to increasing both yield and catalyst life. While, generally, all of the metals will increase catalyst life, sodium and barium are particularly preferred since they are significantly effective in increasing yield in addition to increasing catalyst life. The amount of this added material is not generally critical and usually any amount will be helpful. Preferably, however, the added material will make up about 0.05 to 40 wt. percent of the catalyst, more preferably about 0.3 to 10 wt. percent.

As mentioned above, the dehydrogenation process of the instant invention is carried out in the presence of a sulfur compound. Preferably, the sulfur compound is a sulfur oxide, i.e., $SO_2$ or $SO_3$, or water solutions thereof. However, it is clearly within the purview of the instant invention to employ the sulfur containing compounds in the dehydrogenation zone along with oxygen as is disclosed in U.S. Ser. No. 780,604, filed Dec. 2, 1968, now U.S. Pat. No. 3,590,090, and may consist of cutting the sulfur containing compounds by the addition of oxygen in staged increments throughout the dehydrogenation zone as is described in copending application Ser. No. 780,570, filed Dec. 2, 1968, now U.S. Pat. No. 3,585,249, respectively, the pertinent portions of which are incorporated herein by reference. Thus, carrying out the dehydrogenation process, "in the presence of a sulfur compound," in accordance with the instant invention is meant sulfur compounds, specifically sulfur oxides and the water solutions thereof, either alone or in combination with oxygen.

As has been previously stated herein, it has normally been the practice to utilize realtively large amounts of sulfur dioxide in dehydrogenation reactions. See, for example, U.S. Pat. No. 3,299,155, wherein the mole ratio of sulfur dioxide to hydrocarbon change is maintained at from about 1:1 to about 2:1. As previously mentioned, such high levels of sulfur compound, however, tend to drastically reduce catalyst life by promoting the formation of coke. Now, in the present invention, a sulfur oxide is employed, i.e., $SO_2$ or $SO_3$ or $SO_2/SO_3$ mixtures of their water solutions $H_2SO_3$, $H_2SO_4$, but preferably $SO_2$, and Table I below shows the levels that can be satisfactorily employed herein:

TABLE I

|  | Broad | Pre-ferred | More Pre-ferred | Most Pre-ferred |
|---|---|---|---|---|
| Mol $SO_2$/mol $H_2$ abstracted | 0.01–1.0 | 0.2–1.0 | 0.2–0.7 | 0.2–0.5 |
| Mol $SO_3$/mol $H_2$ abstracted | 0.007–1.0 | 0.15–1.0 | 0.15–0.5 | 0.15–0.4 |

When water solutions of the sulfur oxide are employed, the molar ratios are based on the amount of $SO_2$ or $SO_3$ present therein. It is noted that the term "mol of hydrogen to be abstracted" is used in conjunction with the sulfur level employed (dehydrogenation occurs by abstraction of hydrogen). Thus, for example, in the dehydrogenation of butane to butane one mole of hydrogen is abstracted, but in the dehydrogenation of butane to butadiene two moles of hydrogen are abstracted. Therefore, the term is meaningful and directly related to the actual reaction. It is also noticed that the sulfur levels are quite low, relative to the prior art, thereby reducing coke formation tendencies and lengthening catalyst life.

The rate of feeding the dehydrogenatable compound over the catalyst bed, i.e., the space velocity, may vary rather widely, such as from 0.01 w./w./hr. (weight of feed/ weight of catalyst/hour) to 10 w./w./hr., preferably 0.05 to 1 w./w./hr., more preferably 0.1 to 0.8 w./w./hr.

In a typical reaction sequence involving this invention, a feed charge containing ethylbenzene, sulfur dioxide, and steam is charged to a suitable reactor containing a magnesium oxide catalyst containing about 2 wt. percent coke deposited on the surface thereof. The manner in which the carbonaceous materials, preferably coke, are deposited on the surface of the catalyst is not a critical feature of the instant invention. Preferably, the catalyst is pretreated, i.e., precoked, by passing a heavy hydrocarbon feed stock over the low surface area catalyst at a temperature in the range of from about 700° to about 1,300°F. for a period of time to deposit from about 2 to about 12 wt. percent coke on the surface of said catalyst. The heavy hydrocarbon feed stocks which can be employed to deposit coke on the surface of the catalyst may be broadly classified as those organic feed stocks which have a significant vapor pressure at the treating temperature. Representative examples of such feed stocks include steam cracked tars, high boiling crude fractions, benzothiophene, heavy organic material from the oxydehydrogenation reaction and the like.

Alternatively, a less preferred embodiment consists of pretreating the catalyst in situ by adding to it the organic compound to be dehydrogenated in a controlled amount of a material which will initially deposit coke on the surface of said catalyst. Preferably, the amount of coke which is deposited on the surface of the low surface area dehydrogenation catalyst before introducing said catalyst into the dehydrogenation zone is in the range of from about 0.01 to about 20 wt. percent, and more preferably from about 2 to about 12 wt. percent. While not wishing to be bound to any particular theory, it is believed that the depositing of the heavy carbonaceous material, i.e., coke, on the surface of the catalyst facilitates dehydrogenation of the dehydrogenatable organic compounds by acting as the hydrogen acceptor for this transferred hydrogen reacting with the sulfur compounds in the dehydrogenation zone in accordance with the following type of reaction illustrated for the dehydrogenation of ethylbenzene to styrene:

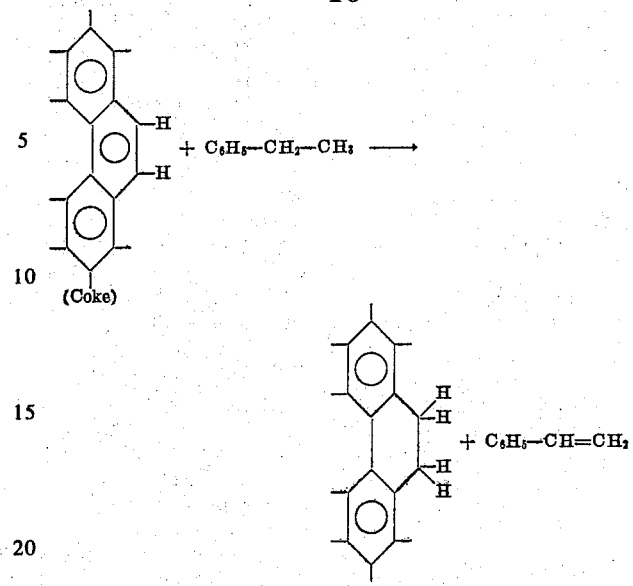

Having now described this invention, the following examples will serve to further illustrate the process. However, no limitations are to be implied from these examples since various modifications and variations will be apparent to those skilled in the art.

EXAMPLE 1

Table II below shows the efficacy of various low surface area catalysts for the dehydrogenation of ethylbenzene to styrene with sulfur dioxide and helium diluent at 1,150°F., 0.3 w./w./hr. and a ratio of 1 mole ethylbenzene to 6 moles helium. The data was obtained using a 1-inch diameter vycor reactor containing 50 cc of catalyst at the desired temperature 1–2 hours after startup.

TABLE II

Catalysts for Dehydrogenating Ethylbenzene Using $SO_2$

| Catalyst | Surface Area m²/g | $SO_2$/EB Mole Ratio | Conv., % | Sel., % | Yield % |
|---|---|---|---|---|---|
| $Al_2O_3$ | 3.9 | 0.33 | 80 | 95 | 76 |
| $AlPO_4$ | 5.7 | 0.33 | 78 | 90 | 71 |
| $SiO_2$ [1] | 0.9 | 0.33 | 87 | 86 | 75 |
| MgO | 110 | 0.33 | 84 | 93 | 78 |
| $CaSO_4$ | 6.3 | 0.33 | 70 | 90 | 63 |
| $FeSO_4$ |  | 0.33 | 62 | 90 | 56 |
| $Ca_3Ni(PO_4)_4$ | 8 | 0.33 | 83 | 96 | 79 |
| Charcoal |  | 0.37 | 46 | 93 | 43 |
| 57% $ZrO_2$ + 43% $HSO_4$ | 0.2 | 0.45 | 63 | 92 | 58 |
| $TiO_2$ | 8.7 | 0.45 | 92 | 86 | 85 |
| $V_2O_5$ |  | 0.45 | 87 | 93 | 82 |

[1] Contains about 3.9% $Na_2O$ and 2.0% CaO

This table clearly shows the high yields that can be obtained with various low surface area catalysts and at relatively low sulfur dioxide levels.

EXAMPLE 2

Table III shows the effect of a variety of oxide and titanate catalysts on the dehydrogenation of ethylbenzene to styrene.

TABLE III

Space Velocity = 0.3 W./W./Hr.
Temperature = 1000°F.
Mole Ratio EB/$SO_2$/He = 1/0.37/4

| Catalyst | EB Conv. % | Styrene Sel. in Mole % | Yield in Mole % |
|---|---|---|---|
| $TiO_2$ (7 m²/g) | 80 | 95 | 76 |
|  | 82 | 96 | 79 |

| | | | |
|---|---|---|---|
| $Al_2O_3$ (3 m²/g) | 68 | 94 | 64 |
| $Ta_2O_5$ (4.5 m²/g) | 84 | 96 | 80 |
| $La_2O_3$ (3 m²/g) | 77 | 94 | 72 |
| $V_2O_5$ (2.7 m²/g) | 74 | 95 | 70 |
| $Nb_2O_3$ (0.1 m²/g) | 49 | 96 | 47 |
| $CeO_2$ (1 m²/g) | 50 | 95 | 47 |
| $ZrO_2$ (1.5 m²/g) | 53 | 93 | 49 |
| $MoO_3$ | 26 | 88 | 23 |
| 19 wt. % CoO on $Al_2O_3$ (100 m²/g) | 57 | 74 | 42 |
| $Al_2O_3$ with 5 wt. % $V_2O_5$ and 5 wt. % CoO (0.5 m²/g) | 41 | 96 | 39 |
| $MnO_2$ | 51 | 94 | 48 |
| Ti (metal) | 23 | 97 | 22 |
| $SrTiO_3$ (3 m²/g) | 77 | 95 | 93 |
| $PbTiO_3$ (2.8 m²/g) | 80 | 95 | 76 |
| $ZnTiO_3$ (1.5 m²/g) | 46 | 91 | 42 |
| $NiTiO_3$ (1.6 m²/g) | 16 | 96 | 15.5 |
| $CeTiO_3$ | 77 | 95 | 73 |
| $BaTiO_3$ (2 m²/g) | 78 | 95 | 73 |
| $Li_2TiO_3$ (0.5 m²/g) | 44 | 93 | 41 |
| $Ba(AlO_2)_2$ (2 m²/g) | 42 | 96 | 40 |

Example 3

This example shows the effect using a primarily steam diluent, i.e., 3 moles steam plus 1 mole helium, which is effectively all steam.

TABLE IV $SO_2$ Dehydrogenation of Ethylbenzene in Presence of a Steam Diluent Temperature = 1175°F.
EB Space Velocity = 0.3 W./W./Hr.
EB/SO₂/Dil. = 1/0.52/4
$Al_2O_3$ Catalyst (3.9 m²/g)

| Run Time Hours | EB Conv. % | Selectivity to Styrene, Mole % | Styrene Yield Mole % |
|---|---|---|---|
| 1 | 94 | 88 | 83 |
| 6 | 84 | 89 | 75 |

After 6 hours' run time, when prior art catalysts have generally deactivated, only a slight decrease in ultimate yield was recorded. This is believed due to the combination of low sulfur dioxide level and low surface area catalyst.

EXAMPLE 4

This example shows the effect of $SO_2$ and diluent concentration, Tables V and VI respectively, on an ethylbenzene dehydrogenation within a helium diluent after 6 hours' run time.

TABLE V

Catalyst = 99.5% $Al_2O_3$-0.5% $Na_2O$
Temperature = 1150°F.
EB Space Velocity — 0.3 W./W./Hr.
EB/He = 1/6

| $SO_2$/EB | EB Conv. % | Styl. Sel. % | Sty. Yield % |
|---|---|---|---|
| 0.33 | 75 | 95 | 71 |
| 0.37 | 86 | 93 | 80 |
| 0.43 | 94 | 93 | 87 |
| 0.60 | 95 | 89 | 85 |

This table shows that as $SO_2$ concentration is increased, conversion of the feed increases but selectivity to styrene decreases. Optimum yield of styrene comes to about 0.5 mole $SO_2$/mole EB.

TABLE VI

Catalyst = 99.5% $Al_2O_3$-0.5% $Na_2O$
Temperature = 1150°F.
EB Space Velocity = 0.3 W./W./Hr.
EB/$SO_2$ = 1/0.37

| He/EB | EB Conv. % | Sty. Sel. % | Sty. Yield % |
|---|---|---|---|
| 6 | 86 | 93 | 80 |
| 5 | 86 | 91 | 78 |
| 4 | 84 | 91 | 77 |
| 3 | 86 | 91 | 78 |
| 2 | 83 | 88 | 73 |
| 1 | 81 | 87 | 70 |

This table shows that helium diluent concentration can be lowered to 3 moles/mole EB without significant loss in styrene yield. While some loss in styrene yield does occur when less than 3 moles of diluent is used, the last line in the above table indicates that it is possible to eliminate the diluent completely when $SO_2$ is used to dehydrogenate ethylbenzene in particular and hydrocarbons in general.

EXAMPLE 5

This example shows the excellent conversions and selectivity levels obtained when steam is employed as the inert diluent in the dehydrogenation of ethylbenzene to styrene with sulfur dioxide and when the surface area of the MgO catalyst is in the narrowly defined critical surface range, i.e., 54 m²/g, of the instant invention. Table VII shows that, when steam is employed as the inert diluent, the selectivity to styrene increases as the $SO_2$ concentration approaches the stoichiometric levels, i.e., from about 0.40 to 0.33 mole of $SO_2$ per mole of ethylbenzene. The optimum yield of styrene is achieved at about 0.37 mole of $SO_2$ per mole of ethylbenzene, when 6 moles of steam per mole of ethylbenzene is employed.

TABLE VII

Temperature = 1075°F.
$H_2O$/EB Feed Mole Ratio = 6
EB Space Velocity — 0.6 W./W./Hr.

| $SO_2$/EB Mole/Mole | EB Conv. % | Styrene Selectivity, % | Styrene Yield, % |
|---|---|---|---|
| 0.40 | 91.4 | 91.4 | 83.5 |
| 0.37 | 91.7 | 91.7 | 84.1 |
| 0.35 | 87.6 | 92.9 | 81.4 |
| 0.33 [1] | 80.5 | 93.5 | 75.3 |

[1] Stoichiometric reaction (I)

EXAMPLE 6

This example shows that when the ethylbenzene dehydrogenation to styrene with $SO_2$ is conducted at elevated pressure, i.e., 20 psig, with a surface area of magnesium oxide of about 54 square meters per gram, excellent selectivities and conversion levels to styrene are obtained.

The data in Table VIII was obtained during 20 successive reaction/regeneration cycles. Each reaction cycle was 6 hours, each regeneration cycle employed 10 percent oxygen in admixture with helium/steam and was approximately of 1 hours' duration.

TABLE VIII

| Temp., °F. | EB space velocity, w./w./hr. | Moles/mole, $SO_2$ | EB, $H_2O$ | EB Conv., percent | Styrene selectivity, percent | Styrene yield, percent |
|---|---|---|---|---|---|---|
| 1,000 | 0.5 | 0.4 | 10 | 82.7 | 90.3 | 74.7 |
| 1,050 | 0.5 | 0.4 | 8 | 90.6 | 87.8 | 79.6 |
| 1,050 | 0.7 | 0.4 | 8 | 89.3 | 89.9 | 80.3 |
| 1,050 | 0.7 | 0.35 | 8 | 84.0 | 91.8 | 77.7 |
| 1,075 [1] | 0.7 | 0.35 | 10 | 86.6 | 91.6 | 79.3 |

[1] 86.5% recovery of sulfur as $H_2S$; twentieth cycle.

EXAMPLE 7

TABLE IX

The Effect of Catalyst Pretreatment on The $SO_2$ Oxidative Dehydrogenation of Ethylbenzene to Styrene Catalyst = MgO 100 m²/g
S.V. = 0.6 gm. hr.⁻¹cc⁻¹
Temperature = 900°F.
EB/SO₂/H₂O = 1/0.37/8

| Run No. | Catalyst Treatment* and Comment | Mole % EB Conv. | Styrene Sel. | Yld. | Time on Stream in min. |
|---|---|---|---|---|---|
| 1 | Untreated catalyst | 13 | 56 | 7 | 30 |
| | | 12 | 37 | 4 | 60 |
| 2 | Repeat of Run No. 1 | 18 | 74 | 13 | 15 |
| | | 19 | 60 | 12 | 30 |
| | | 17 | 53 | 9 | 60 |
| 3 | Catalyst preconditioned for ~3 hr. by running the SO₂ oxydehydro reaction under more favorable conditions to give a 70 wt. % styrene yield | 42 | 85 | 35 | 45 |
| 4 | Repeat of Run No. 3 | 38 | 86 | 32 | 45 |
| 5 | Catalyst pretreated with Rainbow Lake Crude Oil (40 gm. of crude oil per 100 gm. MgO) containing ~15 wt. % with a boiling pt. >900°F. | 64 | 93 | 60 | 30 |
| | | 58 | 91 | 53 | 60 |
| 6 | Repeat of Run No. 5 | 51 | 95 | 49 | 15 |
| | | 51 | 91 | 46 | 30 |
| | | 47 | 92 | 43 | 60 |

* For each run fresh catalyst was used rather than catalyst regenerated by burning the coke off with an O₂/He mixture.

Table IX shows the effect of pre-treating a low surface area catalyst with a controlled amount of carbonaceous material in accordance with the sulfur oxide dehydrogenation of ethylbenzene to styrene. Run Nos. 1 and 2 were operated at less preferred conditions, i.e., temperature and pressure to insure low yields to the desired hydrogenated product, i.e., styrene. In Run Nos. 3 and 4, the catalyst was first employed in the dehydrogenation process for a period of about 3 hours under more preferred reaction conditions until the styrene yield reached 70 weight percent before employing said catalyst in Run Nos. 3 and 4. In Run Nos. 5 and 6 the catalyst was pre-treated by depositing about 6 weight percent carbonaceous material on the surface thereof.

As can be seen from the results shown in Table IX, the depositing of the controlled amount of coke on the low surface area dehydrogenation catalyst significantly increases the yield to the desired dehydrogenated product during the initial stages of the dehydrogenation reaction. Run Nos. 1 and 2, wherein the catalyst was not pretreated so as to have a controlled amount of coke on the surface thereof, result in obtaining very poor yields of the desired dehydrogenation product when the dehydrogenation reaction is conducted at a temperature of 900°F. and at a space velocity of 0.6 g/hr. per cc. However, it can be seen from the results as shown in Run Nos. 3 and 4, after a low surface area dehydrogenation catalyst has been on stream for a period of about 3 hours under more preferable conditions, i.e., 1,050°F. and a space velocity of 0.6 gm. hr.⁻¹cc.⁻¹, said catalyst results in obtaining a much higher yield to the desired dehydrogenated product. Furthermore, Run Nos. 5 and 6 clearly show that when a low surface area dehydrogenation catalyst was treated in accordance with the instant invention so as to deposit about 6 wt. percent coke on the surface of said catalyst, the initial conversion selectivity and thus overall yield to the desired dehydrogenated product is significantly increased during the initial stages of the dehydrogenation reaction.

Figure 2:
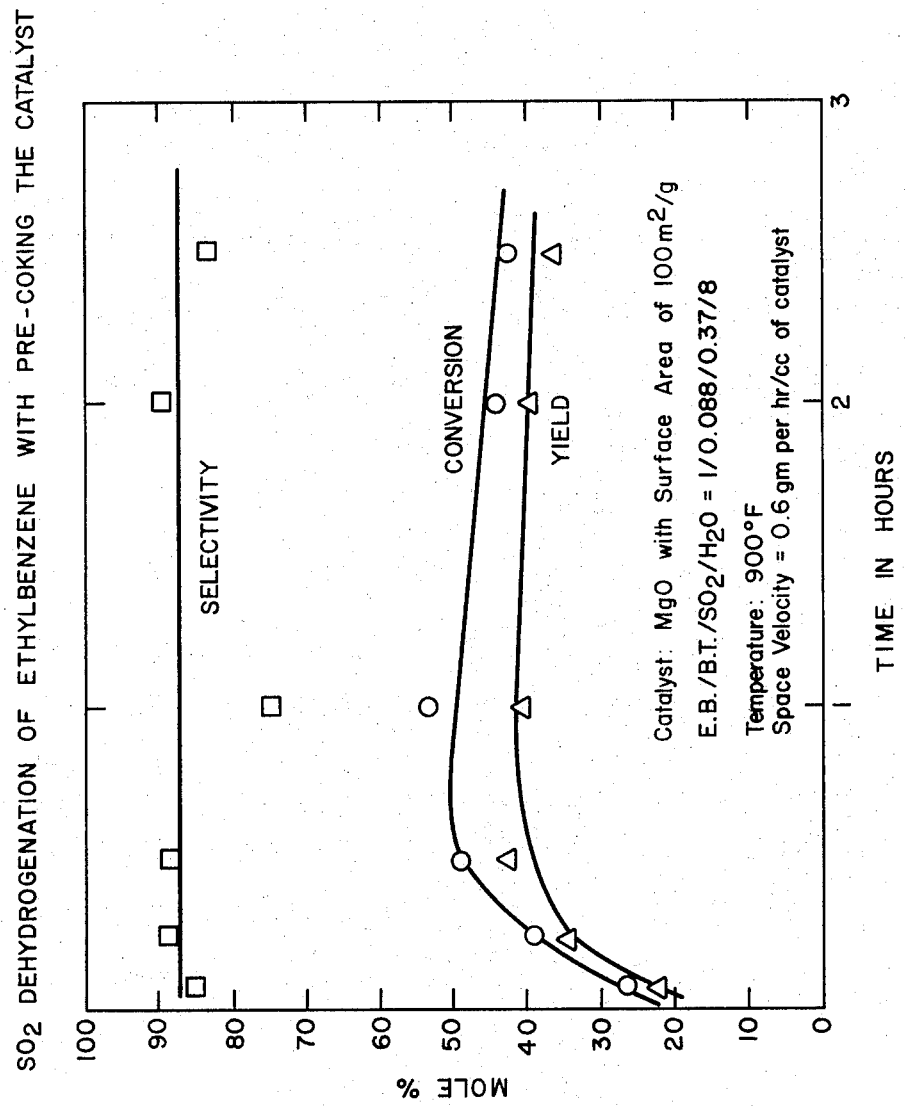

In addition, it should be noted that the identical conditions employed for Run Nos. 1 and 2 were employed for the dehydrogenation of ethylbenzene as shown in FIG. 2. Accordingly, when benzothiophene was added to the feed as indicated in FIG. 2, it can be seen that pre-coking the catalyst increased the styrene yield from 4 to 9 mole percent as shown in Run Nos. 1 and 2 to approximately 50 mole percent.

What is claimed is:

1. In a process for dehydrogenating a dehydrogenatable organic compound wherein a feed mixture consisting of a dehydrogenatable organic compound having at least one

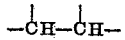

grouping is reacted with a sulfur oxide and in inert diluent in the vapor phase at a temperature of above about 700°F. in the presence of a low surface area catalyst having a surface area ranging from about 0.5 to about 100 square meters per gram, the improvement which comprises depositing from about 0.01 to about 20 weight percent carbonaceous material on the surface of said low surface area catalyst before introducing said catalyst into the dehydrogenation zone.

2. The process of claim 1 wherein said inert diluent is steam.

3. The process of claim 2 wherein said dehydrogenatable hydrocarbon is selected from the group consisting fo $C_4$-$C_8$ paraffins and monoolefins, $C_8$-$C_{10}$ alkyl benzenes, and $C_8$-$C_{10}$ alkyl and alkyl-substituted cycloaliphatics.

4. The process of claim 3 wherein said carbonaceous material is coke and wherein the amount of coke which is deposited on the catalyst is in the range of about 2.0 to about 12.0 weight percent.

5. The process of claim 4 wherein sulfur dioxide is employed as the sulfur oxide and wherein the molar ratio of the sulfur dioxide to the moles of hydrogen to be abstracted from the dehydrogenatable organic compound is in the range of from about 0.2 to about 0.7.

6. The process of claim 5 wherein the low surface area catalyst contains a member selected from the group consisting of oxides and metals of groups IIa, IIIa, IVa, IVb, and Vb metals, and mixtures thereof.

7. The process of claim 6 wherein the low surface area catalyst contains magnesium.

8. The process of claim 7 wherein said dehydrogenatable organic compound is ethylbenzene.

9. The process of claim 8 wherein from about 4 to about 8 weight percent coke is deposited as the carbonaceous material on the surface of said catalyst.

10. The process of claim 9 wherein said process is conducted in a fluidized bed.

* * * * *